US009925909B2

(12) United States Patent
Byham

(10) Patent No.: US 9,925,909 B2
(45) Date of Patent: Mar. 27, 2018

(54) UNIVERSAL PROPANE TANK TRANSPORT BRACKET FOR PICKUP TRUCKS

(71) Applicant: John Byham, Meadville, PA (US)

(72) Inventor: John Byham, Meadville, PA (US)

( * ) Notice: Subject to any disclaimer, the term of this patent is extended or adjusted under 35 U.S.C. 154(b) by 187 days.

(21) Appl. No.: 15/146,956

(22) Filed: May 5, 2016

(65) Prior Publication Data

US 2016/0325669 A1 Nov. 10, 2016

Related U.S. Application Data

(60) Provisional application No. 62/157,521, filed on May 6, 2015.

(51) Int. Cl.
*B60P 3/055* (2006.01)
*B60P 7/08* (2006.01)

(52) U.S. Cl.
CPC .............. *B60P 7/0807* (2013.01); *B60P 3/055* (2013.01)

(58) Field of Classification Search
CPC ....... B60P 7/0807; B60P 3/055; B60P 3/2215; B60P 7/08; B60P 7/135; A62B 25/00; A62C 13/78
USPC ................ 280/830; 224/532, 402, 403, 404; 248/74.1, 74.3; 296/37.6; 410/153, 155
See application file for complete search history.

(56) References Cited

U.S. PATENT DOCUMENTS

| | | | | |
|---|---|---|---|---|
| 4,630,990 A * | 12/1986 | Whiting | ................. | B60R 9/042 224/310 |
| 4,676,413 A * | 6/1987 | Began | ...................... | B60R 9/10 224/493 |
| 4,860,986 A * | 8/1989 | Couzens | ................ | B60N 3/103 248/310 |
| 5,025,935 A * | 6/1991 | Hadachek | ............... | B63C 11/02 211/60.1 |
| 5,593,076 A * | 1/1997 | Biondo | ..................... | B60R 9/06 224/485 |
| 5,799,849 A * | 9/1998 | Beer | ........................ | B60R 11/00 224/282 |
| 6,378,819 B1 * | 4/2002 | Johnson | ................... | B60R 9/06 24/525 |
| 6,832,709 B2 * | 12/2004 | Henry | ...................... | B60D 1/06 224/403 |
| 6,863,198 B1 * | 3/2005 | Darby | ....................... | B60R 7/02 224/403 |
| D591,208 S * | 4/2009 | Wubker, Jr. | ................. | D12/162 |
| 8,231,035 B1 * | 7/2012 | Michael | .................... | B60R 7/02 224/403 |
| D666,897 S * | 9/2012 | Church | ......................... | D8/373 |
| 2007/0114257 A1 * | 5/2007 | Brown | .................... | B60P 3/055 224/403 |

* cited by examiner

*Primary Examiner* — Anne Marie M Boehler
(74) *Attorney, Agent, or Firm* — Shumaker, Loop & Kendrick, LLP

(57) ABSTRACT

A universal propane tank transport bracket including a universal adapter having parallel first and second plates, a first receiver parallel to the first plate, and a second receiver at angle to the first plate, the first and second plates adapted to clamp around tie down structure, an elongate post having a perpendicular leg adapted to be received in the first receiver or the second receiver, a collar lockable along a length of the elongate post, and an adjustable strap attached to the collar, the adjustable strap adapted to capture a propane tank.

14 Claims, 8 Drawing Sheets

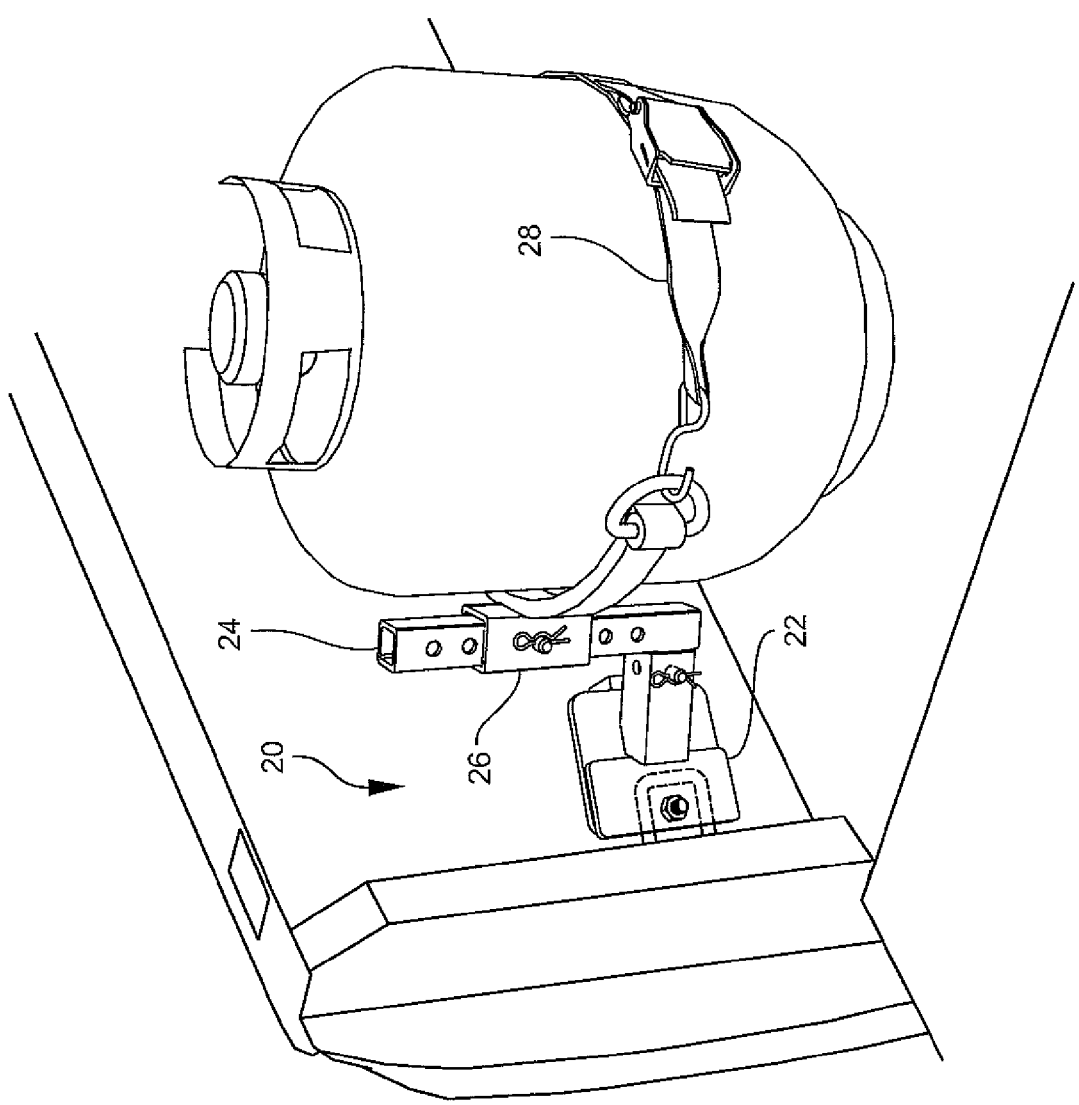

UNIVERSAL PROPANE TANK TRANSPORT BRACKET FOR PICKUP TRUCKS

CROSS-REFERENCE TO RELATED APPLICATION

This Application claims priority from U.S. Application No. 62/157,521 filed May 6, 2015, the entirety of which is incorporated by reference herein.

TECHNICAL FIELD AND BACKGROUND OF THE INVENTION

The present invention relates generally to the field of transporting gas cylinders such as propane tanks, and more particularly, to a universal propane tank bracket adapted to mount in the bed of a pickup truck to secure a propane tank during transport.

Propane is commonly used to fuel barbecues grills, patio heaters, fire pits, and heating and cooking appliances in RVs and campers, due to its ability to be delivered through a simple metering nozzle and general portability. Propane tanks come in various sizes, with the most common sizes being 20 lb and 30 lb tanks. A 20 lb tank holds approximately 4.7 gallons of propane and weighs approximately 37 lbs when full. 20 lb tanks are commonly used to fuel residential grills, space heaters and fire pits, and are readily available for new purchase and tank exchange at most home improvement, hardware and convenient stores. 30 lb propane tanks hold approximately 7 gallons of propane and weigh approximately 55 lbs when full, and are most commonly used for campers and camper trailers mounted as a pair of tanks on the tongue of the trailer. Less common tank sizes include 5 lb and 11 lb tanks primarily used in marine applications, and 40 lb tanks used in construction applications.

Regardless of tank size, propane tanks are portable steel cylinders that must be transported when empty for filling or exchange. Transport requires detaching the tank from its respective appliance and loading into a vehicle. Cylindrical steel tanks are heavy and unstable, and therefore must be secured in place during transport to prevent shifting and rolling which can cause vehicle damage. Transporting a dirty tank in a vehicle interior is undesirable because it can damage and soil the seats, carpets and door panels. Therefore, when possible, it is preferable to transport the tank in the trunk of the vehicle or in the bed of a pickup truck.

One conventional method for securing a propane tank in a pickup truck bed involves securing ropes and/or bungee cords around the tank and tying off to structure in the bed, such as the manufacturer provided D-rings or tie downs. This conventional method is not only cumbersome and time consuming, but if not done correctly, tends to come loose during transport. As such, the tank tends to free itself from the ropes or, at the least, loosen to the point where the tank is able to tip over.

To overcome the disadvantages associated with loose rope and bungee cords, others have developed brackets that secure to the bed and capture the tank. While suitable for securing the tank in place, these conventional solutions are truck manufacturer specific, and thus require a unique bracket design for each type and location of manufacturer installed tie down. Multiple brackets designs are not only costly, but require a new bracket to be purchased with every truck change.

Accordingly, to overcome the disadvantages of prior art solutions, the present invention provides a universal bracket configured to mount within any manufacturer pickup truck to securely hold a propane tank in place. The bracket is universal in that it is compatible with multiple tie down configurations, orientations, and positions, as well as with various tank sizes.

BRIEF SUMMARY OF THE INVENTION

In a preferred embodiment, the present invention provides a universal propane tank bracket including a universal adapter having parallel first and second plates arranged to clamp together, a first receiver attached to a first face of the first plate parallel thereto, and a second receiver attached to a second face of the first plate at an angle thereto, an elongate post having a perpendicular leg adapted to be received in the first receiver or the second receiver, a collar lockable along a length of the elongate post, and an adjustable strap attached to the collar for capturing a propane tank.

In one aspect, the collar can include a rigid arcuate member to which opposite ends of the adjustable strap are attached.

In another aspect, each of the first and second plates can define an opening therethrough, wherein the openings through the first and second plates are aligned and a fastener is received therethrough, and wherein the fastener is tightened to draw the first and second plates together.

In another aspect, the first receiver or the second received can be removably attached to the perpendicular leg using a clevis pin and hitch pin clip.

In another aspect, the elongate post can include a plurality of openings perpendicular to a longitudinal axis thereof, and the collar can be lockable along the length of the elongate post using a clevis pin and hitch pin clip.

In another aspect, the perpendicular leg can be positioned near one end of the elongate post.

In another aspect, each of the first receiver, the second receiver, and the elongate post can be linear square tubes.

In another aspect, the first and second plates can be adapted to clamp around a tie down or D-ring in a pickup truck bed.

In another aspect, the second plate can be smaller than the first plate and can be arranged facing the second face of the first plate.

In another embodiment of the invention, the present invention provides a universal propane tank transport bracket including a universal adapter having parallel first and second plates, a first receiver parallel to the first plate, and a second receiver at angle to the first plate, the first and second plates adapted to clamp around tie down structure, an elongate post having a perpendicular leg adapted to be received in the first receiver or the second receiver, a collar lockable along a length of the elongate post, and an adjustable strap attached to the collar, the adjustable strap adapted to capture a propane tank.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF THE INVENTION

Figures 1, 2:
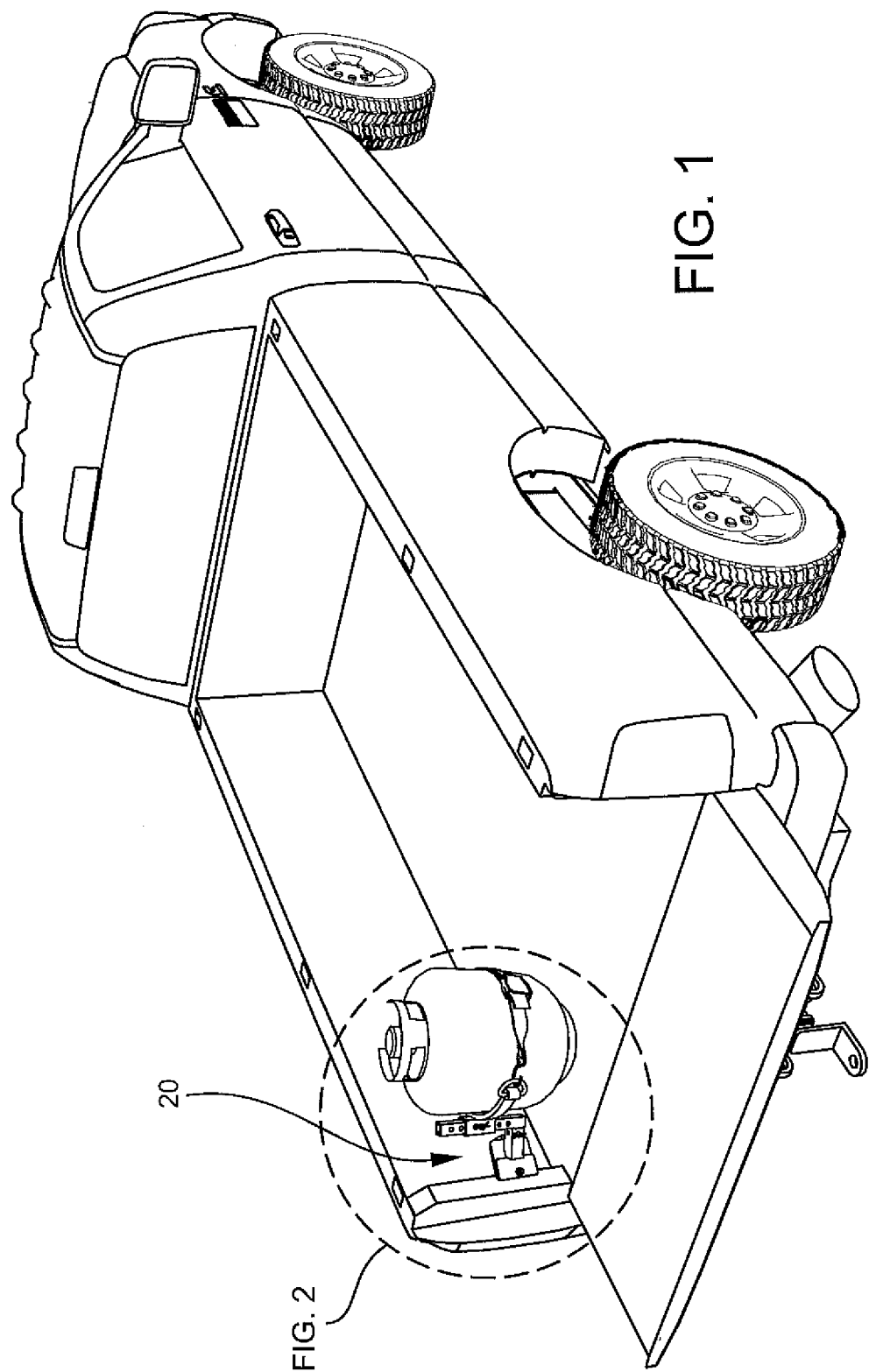
FIG. 1 illustrates a universal propane tank bracket according to a preferred embodiment of the invention shown installed in the bed of a pickup truck and securing a 20 lb propane tank.
FIG. 2 is a detailed view of the installed bracket of FIG. 1.
Figure 3:
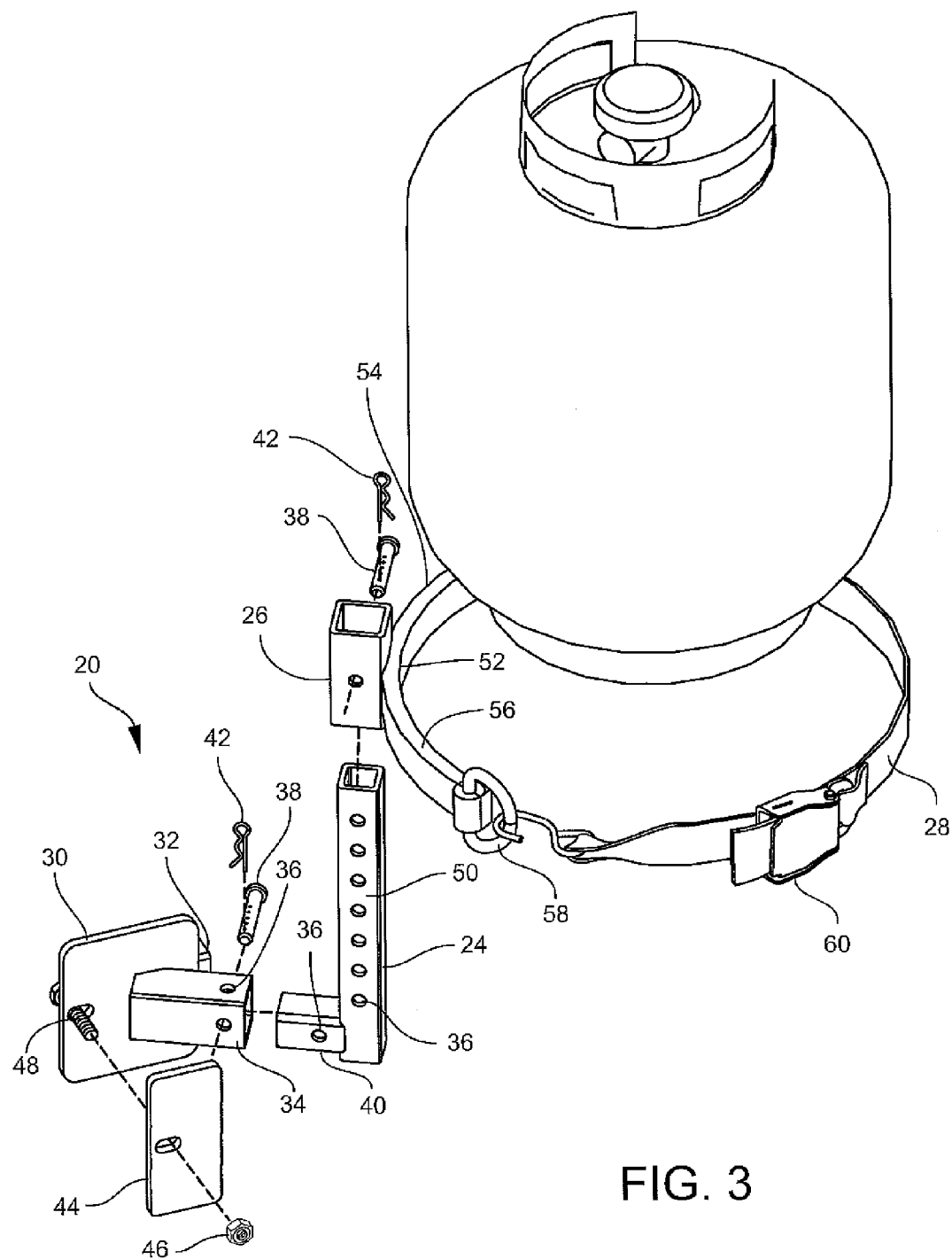
FIG. 3 is an exploded view of the bracket of FIG. 1.
Figure 4:
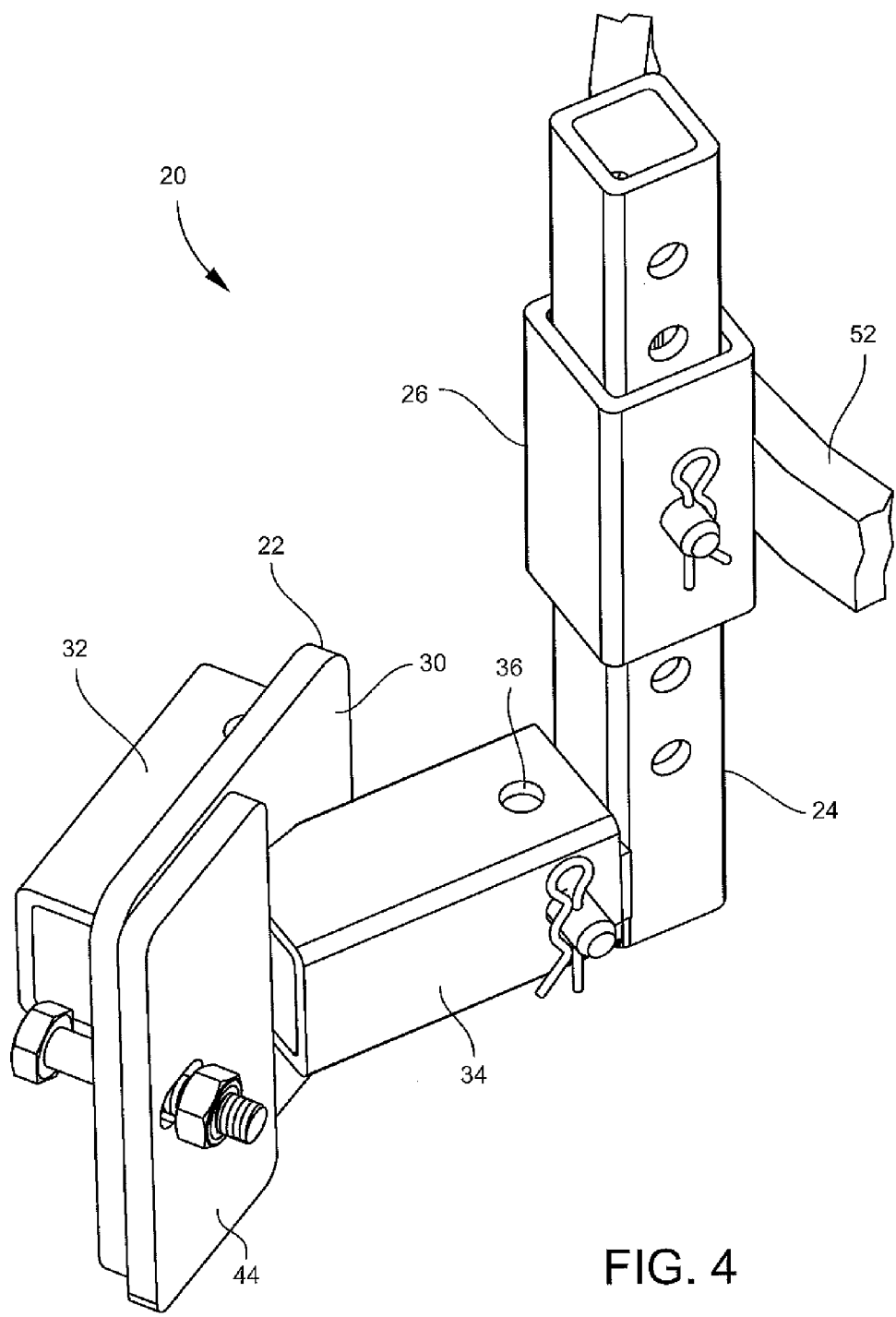
FIG. 4 is a perspective view of the bracket of FIG. 1 shown in one particular mounting orientation.
Figure 5:
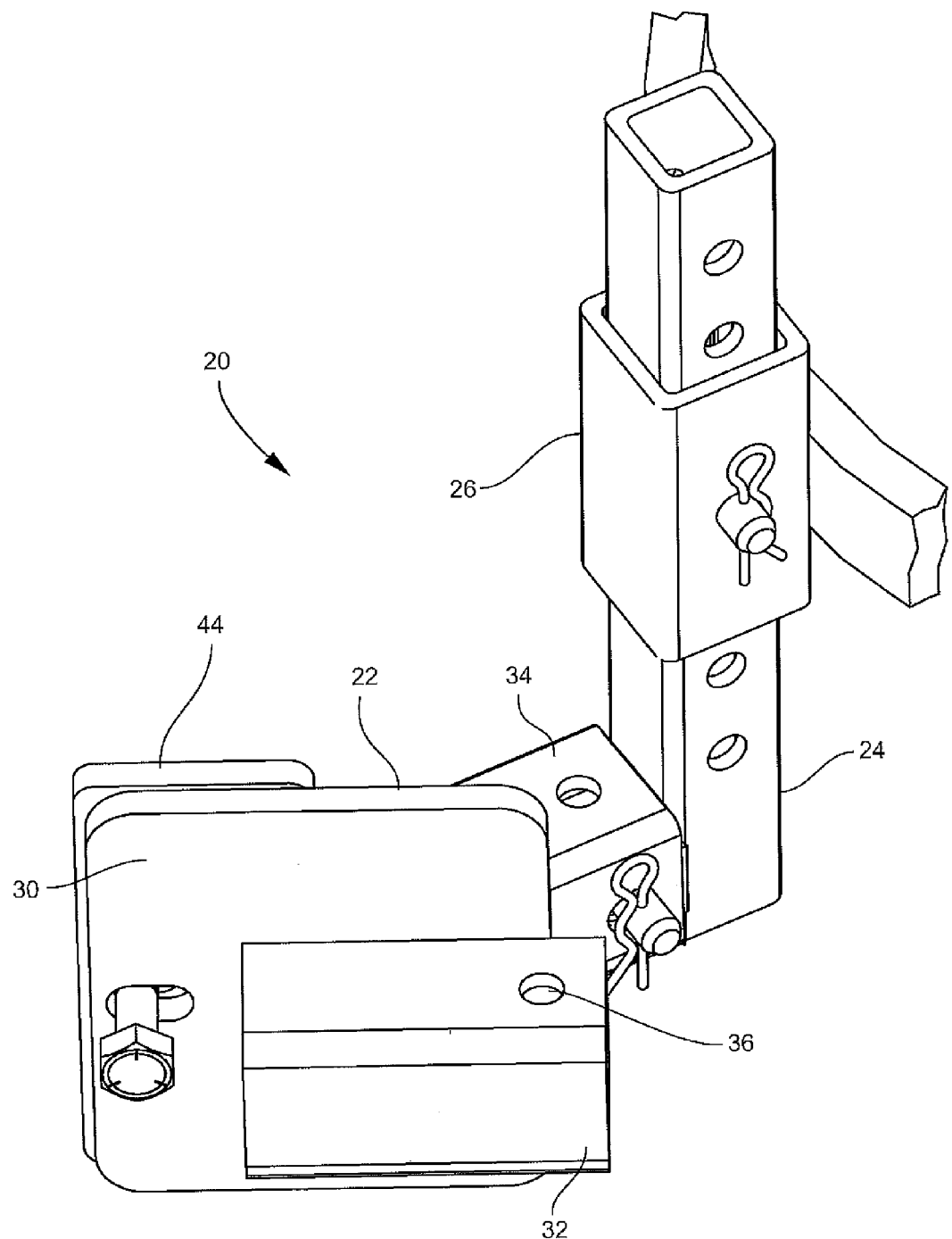
FIG. 5 is a perspective view of the bracket of FIG. 1 shown in another mounting orientation.
Figure 6:
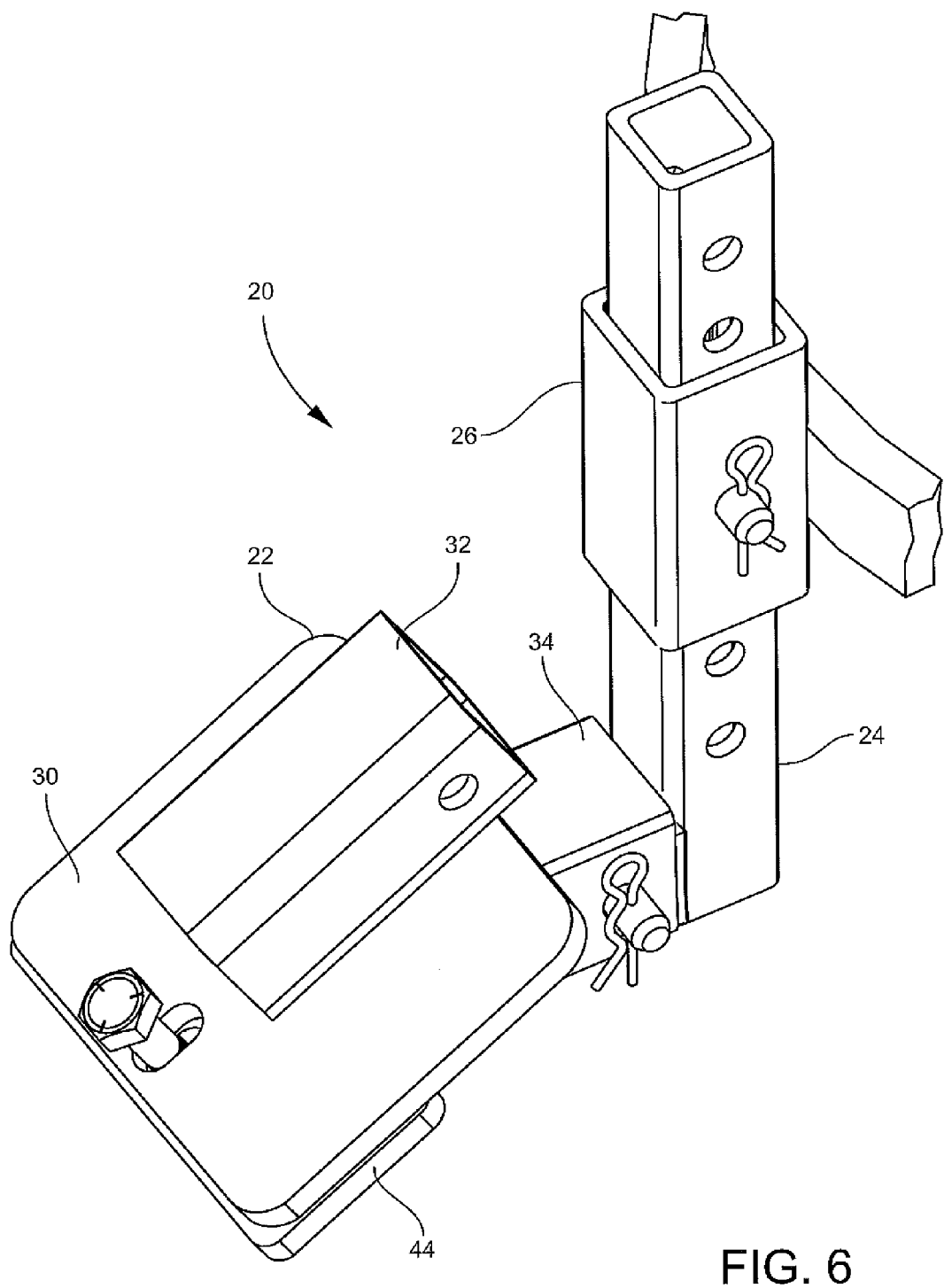
FIG. 6 is a perspective view of the bracket of FIG. 1 shown in yet another mounting orientation.
Figure 7:
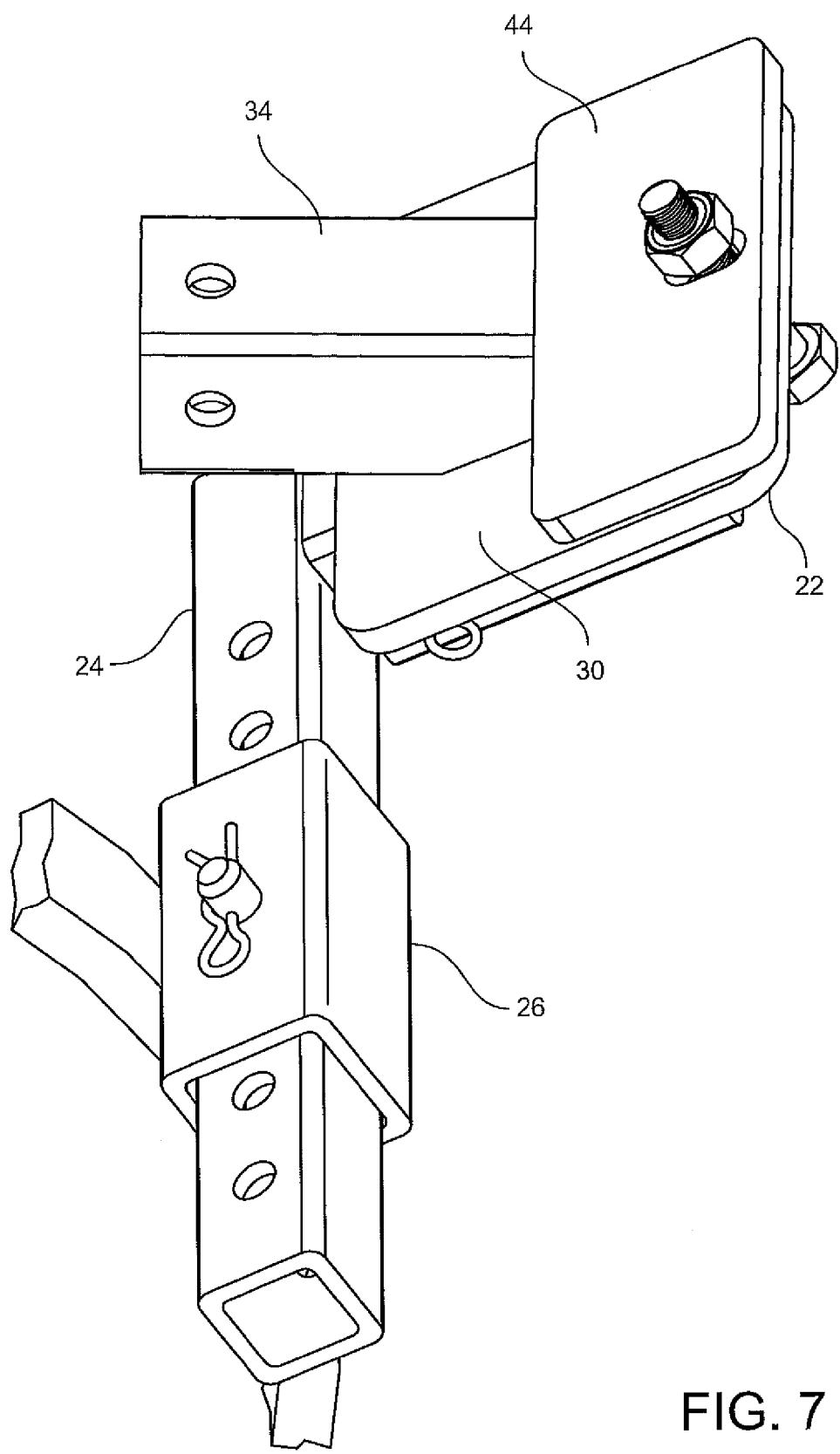
FIG. 7 is a perspective view of the bracket of FIG. 1 shown in yet another mounting orientation.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

FIGS. 1-7 show various assembled and disassembled configurations of the universal propane tank bracket according to a preferred embodiment of the invention. The universal propane tank bracket 20, also referred to herein as the "bracket," generally includes a universal adapter 22, an elongate post 24, and a collar 26. The universal adapter 22 is configured to mount in various positions and orientations in order to be compatible with various tie down and D-ring configurations, orientations, and positions found in truck beds from manufacturers such as Ford®, GM®, Chrysler®, Toyota®, etc. The elongate post 24 is detachable from the universal adapter 22 in order to attach thereto in various orientations, as described in detail below. The collar 26 carries the adjustable strap 28 used to capture the tank and is slidable along the length of the elongate post 24 to adjust the vertical height of the collar depending on the tie down position and tank height.

The universal adapter 22 generally includes a primary or first plate 30 having first and second receivers 32, 34 attached to opposing major faces thereof. The first receiver 32 defines a passageway therethrough and is arranged parallel to a first face of the first plate 30. The second receiver 34 defines a passageway therethrough and is arranged at an angle to the second major face of the first plate 30. For example, the second receiver 34 can be oriented at about a 30 degree angle relative to the plate face in order to mount to a 30 degree tie down angle to position the second receiver 34 perpendicular to the sidewall of the pickup truck bed. Other angles are possible, for example, 45 degrees and angles less than 90 degrees. The first receiver 32 defines two aligned openings 36 through opposite faces thereof for receiving a clevis pin 38 for securing a leg 40 of the elongate post 24 therein. The second receiver 34 defines four aligned openings 36 through all four faces for receiving a clevis pin 38 to secure the leg 40 therein in 90 degree offset positions depending on tie down position and orientation. A hitch pin clip 42 received through the end of the clevis pins 38 prevent the clevis pins from being pulled out. While clevis pins and hitch pin clips are shown as suitable fasteners, it is envisioned that other fasteners may be used including, but not limited to, lynch pins, cotter pins, nuts and bolts.

The universal adapter 22 further includes a second plate 44 arranged parallel to the first plate 30. The first and second plates 30, 44 together form a clamp that clamps around an existing tie down in the truck bed. The first and second plates 30, 44 are held together with a nut 46 and bolt 48, or other suitable fastener, wherein the bolt is received through openings 36 in the plates and the nut is advanced on the bolt to apply inward pressure to compress the tie down between the two plates. For installation, the nut 46 is removed from the bolt 48, the second plate 44 removed from the bolt, the bolt advanced through the opening in the tie down, the second plate replaced on the bolt, the nut screwed back onto the bolt, and the nut tightened to compress the tie down between the plates to prevent relative movement between the universal adapter and the captured tie down. In alternative embodiment, the first receiver 32 can be mounted to the first plate 30 and the second receiver 34 can be mounted to the second plate 44.

The elongate post 24 generally includes a main elongate member 50 and a perpendicular leg 40. The main elongate member 50 is linear, hollow and has a square lateral cross-section. The leg 40 is positioned near one end of the main elongate member 50 and extends perpendicularly from a face thereof in order to engage within the appropriate receiver 32, 34 depending on the adapter orientation. Four openings 36 are provided through the four faces of the leg that align with the openings through the receivers 32, 34 so that the clevis pin 38 passes through the aligned openings of both the receiver and leg to secure the two together. Openings 36 are provided through opposite faces of the main elongate member 50 along the length thereof on the faces perpendicular to the face from which the leg 40 extends. In this arrangement, the leg 40 can be mounted perpendicular to the sidewall of the pickup bed such that a clevis pin 38 advanced through the main elongate member 50 is parallel with the sidewall. This allows the collar 26 to slide up and down the post and the clevis pin 38 to be inserted through the side of the post.

The collar 26 is adjustable along the length of the post 24 to position the collar at the appropriate height to hold the tank. For example, a taller 30 lb tank may require a greater distance between the leg 40 and collar 26 to secure around generally the middle of the tank, while a 20 lb tank may require a lesser distance between the leg and collar to secure around the middle of the tank. The collar 26 may also need to be raised and lowered depending on the distance of the tie down from either the floor of the truck bed or from the top of the bed.

The collar 26 includes a square tube slidable along the length of the main elongate member 50 and has corresponding openings 36 therethrough for receiving a clevis pin 38 for fixing the position of the collar relative to the elongate post 24. The collar 26 can further includes a rigid arcuate member 52 that extends as left and right wings 54, 56 from the square tube. The arcuate portion 52 is shaped to conform to the shape of the tank. Each wing 54, 56 can terminate in a loop 58 used to fasten/hook the ends of a ratchet tie down 60 secured around the tank. While an adjustable strap 28 in the form of a ratchet tie down is shown capturing the tank, it is envisioned that other adjustable strap assemblies can be used including, but not limited to, a strap and buckle, hook and loop fasteners, a band, etc.

Figure 8:
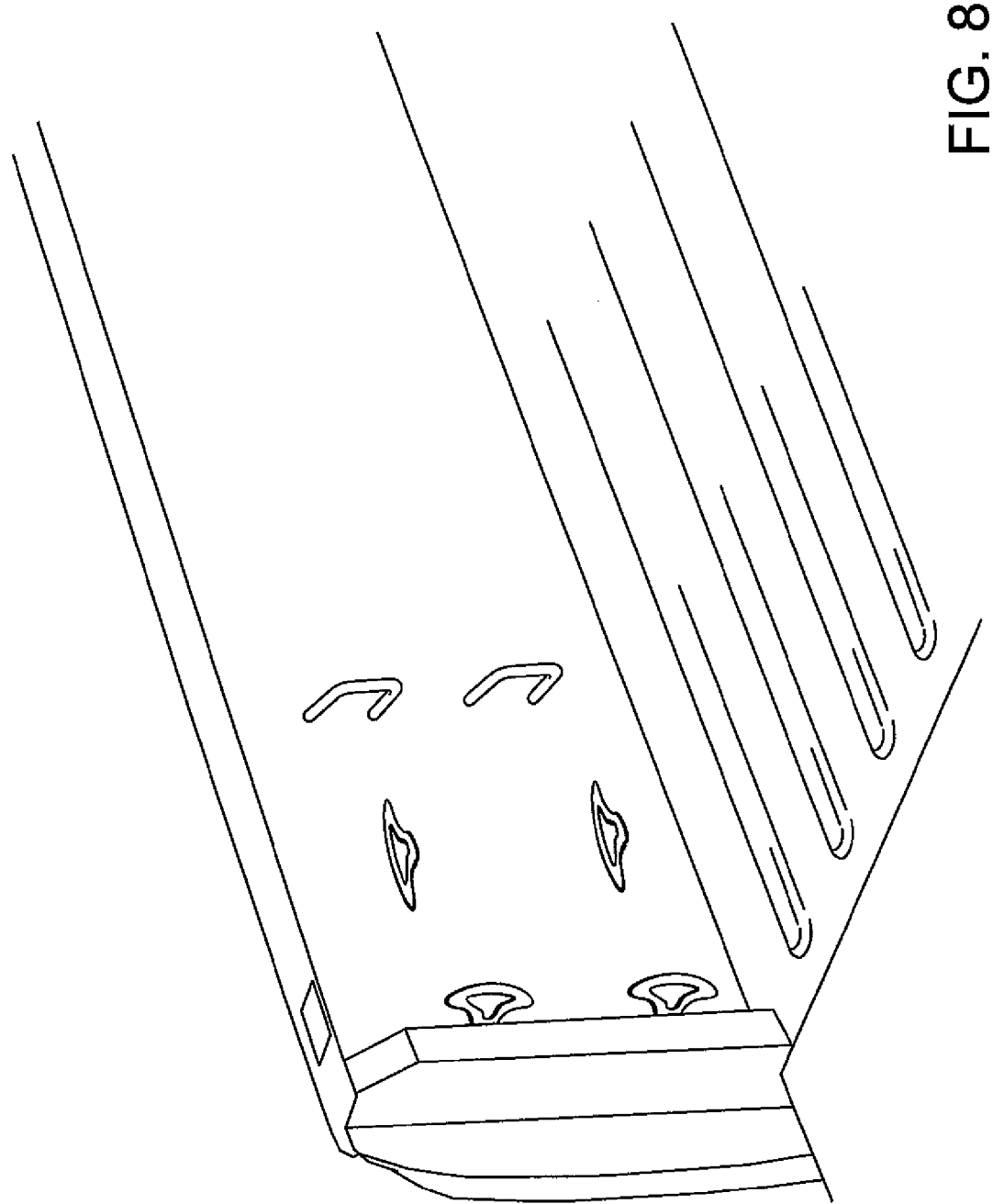
FIG. 8 shows a portion of a generic pickup truck bed illustrating exemplary tie-down and D-ring mounting locations and orientations.

FIGS. 4-7 illustrate various possible mounting configurations for accommodating potential tie down and D-ring configurations, locations, and orientations shown collectively in FIG. 8. Truck manufacturers, some of which include Ford®, GM®, Chrysler® and Toyota®, typically provide at least one tie down in the bed of the truck for general purpose use. For example, Ford® presently uses tie downs in their line of F-Series® pickup trucks that extend at about a 30 degree angle to horizontal, and may orient the tie downs vertically or horizontally. Tie downs may be positioned proximate the floor of the bed or proximate the top rail, may be attached to the sidewall or the end wall of the bed, may be positioned proximate the cab or apart from the cab, etc. GM® presently uses vertically oriented D-rings positioned proximate the floor of the bed in their new Colorado®, Silverado® and Sierra® lines of pickup trucks. Toyota® presently uses vertically oriented D-rings attached to the end wall of the bed. The bracket according to present invention is universal in that it can mount to any manufacturer tie down regardless of tie down configuration (e.g., tie down, D-ring, cleat, etc.), orientation (e.g., vertically or horizontally mounted), angle (e.g., perpendicular or 30 degrees), and position, (e.g., proximate the floor or top of the bed and located on either the sidewall or end wall of the bed).

For example, one exemplary installation includes mounting the bracket 20 to a vertically-oriented tie down that extends from its respective attachment wall at about a 30 degree angle. The tie down may be positioned near the floor of the bed. As such, the elongate post 24 would extend vertically upward from the universal adapter 22, and the universal adapter 22 would be vertically-oriented and mounted such that the second receiver 34 is presented for use and extends perpendicularly away from the sidewall. As such, the arcuate portion 52 of the collar 26 would be oriented generally parallel to the sidewall and positioned to capture the tank to hold it close to the sidewall.

In another exemplary installation, the bracket 20 may be mounted to a vertically-oriented D-ring that extends perpendicularly away from the sidewall. In this tie down configuration, the universal adapter 22 would be mounted vertically such that the first receiver 32 is perpendicular to the wall and presented for receiving the leg 40. As such, the arcuate portion 52 of the collar 26 would be oriented generally parallel to the sidewall and positioned to capture the tank and hold it close to the sidewall.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A universal propane tank transport bracket, comprising:
a universal adapter including parallel first and second plates arranged to clamp together, a first receiver attached to a first face of the first plate parallel thereto, and a second receiver attached to a second face of the first plate at an angle thereto;
an elongate post having a perpendicular leg adapted to be received in the first receiver or the second receiver;
a collar lockable along a length of the elongate post; and
an adjustable strap attached to the collar, the adjustable strap adapted to capture a propane tank;
wherein each of the first receiver, the second receiver, and the elongate post are linear square tubes.

2. The universal propane tank transport bracket of claim 1, wherein the collar comprises a rigid arcuate member to which opposite ends of the adjustable strap are attached.

3. The universal propane tank transport bracket of claim 1, wherein each of the first and second plates defines an opening therethrough, wherein the openings through the first and second plates are aligned and a fastener is received therethrough, and wherein the fastener is tightened to draw the first and second plates together.

4. The universal propane tank transport bracket of claim 1, wherein the first receiver or the second received is removably attached to the perpendicular leg using a clevis pin and hitch pin clip.

5. The universal propane tank transport bracket of claim 1, wherein the elongate post comprises a plurality of openings perpendicular to a longitudinal axis thereof, and the collar is lockable along the length of the elongate post using a clevis pin and hitch pin clip.

6. The universal propane tank transport bracket of claim 1, wherein the perpendicular leg is positioned near one end of the elongate post.

7. The universal propane tank transport bracket of claim 1, wherein the first and second plates are adapted to clamp around a tie down or D-ring in a pickup truck bed.

8. The universal propane tank transport bracket of claim 1, wherein the second plate is smaller than the first plate and is arranged facing the second face of the first plate.

9. A universal propane tank transport bracket, comprising:
a universal adapter including parallel first and second plates, a first receiver parallel to the first plate, and a second receiver at angle to the first plate, the first and second plates adapted to clamp around tie down structure;
an elongate post having a perpendicular leg adapted to be received in the first receiver or the second receiver;
a collar lockable along a length of the elongate post; and
an adjustable strap attached to the collar, the adjustable strap adapted to capture a propane tank;
wherein each of the first receiver, the second receiver, and the elongate post are linear tubes having a square cross-section.

10. The universal propane tank transport bracket of claim 9, wherein the collar comprises a rigid arcuate member to which opposite ends of the adjustable strap are attached.

11. The universal propane tank transport bracket of claim 9, further comprising a fastener received through the first and second plates for drawing the first and second plates together.

12. The universal propane tank transport bracket of claim 9, wherein the first receiver or the second receiver is removably attached to the perpendicular leg using a clevis pin and hitch pin clip.

13. The universal propane tank transport bracket of claim 9, wherein the elongate post comprises a plurality of openings perpendicular to a longitudinal axis thereof, and the collar is lockable along the length of the elongate post using a clevis pin and hitch pin clip.

14. The universal propane tank transport bracket of claim 9, wherein the perpendicular leg is positioned near one end of the elongate post.

\* \* \* \* \*